United States Patent
Gorbet et al.

(10) Patent No.: US 7,293,239 B2
(45) Date of Patent: Nov. 6, 2007

(54) CONTROLLING ACCESS TO PROTECTED DATA AND ASSESSMENT FUNCTIONS VIA BROWSER REDIRECTION

(75) Inventors: David P. H. Gorbet, Seattle, WA (US); Eric M. Fisk, Seattle, WA (US); Eugene Robert Goodrich, Bothell, WA (US); Eric Ledoux, Bellevue, WA (US); Jason Michael Palmer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/732,743

(22) Filed: Dec. 10, 2003

(65) Prior Publication Data

US 2005/0132020 A1   Jun. 16, 2005

(51) Int. Cl.
  *G06F 15/16*  (2006.01)
(52) U.S. Cl. ................... 715/741; 715/737; 709/217
(58) Field of Classification Search ............... 715/740, 715/742, 745, 746, 748
  See application file for complete search history.

(56) References Cited

U.S. PATENT DOCUMENTS

| | | | |
|---|---|---|---|
| 6,052,785 A | 4/2000 | Lin et al. ............... 713/201 |
| 6,988,138 B1 * | 1/2006 | Alcorn et al. ........... 709/225 |
| 7,003,576 B2 * | 2/2006 | Bjornestad et al. ...... 709/229 |
| 2002/0138841 A1 * | 9/2002 | Ward ...................... 725/78 |
| 2003/0158820 A1 | 8/2003 | Mathur et al. ........... 705/67 |

\* cited by examiner

*Primary Examiner*—Kristine Kincaid
*Assistant Examiner*—Chris Watt
(74) *Attorney, Agent, or Firm*—Workman Nydegger

(57) ABSTRACT

Enabling an organization to control user assignments and assessment results while enabling a proprietary provider to maintain control over both network distribution of proprietary content comprising the assignments and use of proprietary assessment functions that evaluate the user's performance of the assignments. A student uses a browser to submit a request to a learning management system (LMS) that includes a URL to a network node hosting the proprietary learning content and assessment functions. The LMS sends a hidden form to the browser, causing the browser to automatically redirect to the network node. The proprietary provider then controls distribution of the proprietary learning content to the browser and controls the student's interaction with the proprietary learning content to accomplish the assignment. When the student submits responses to the assignment, the proprietary provider performs proprietary assessment functions and redirects only results data to the LMS through the browser.

20 Claims, 9 Drawing Sheets

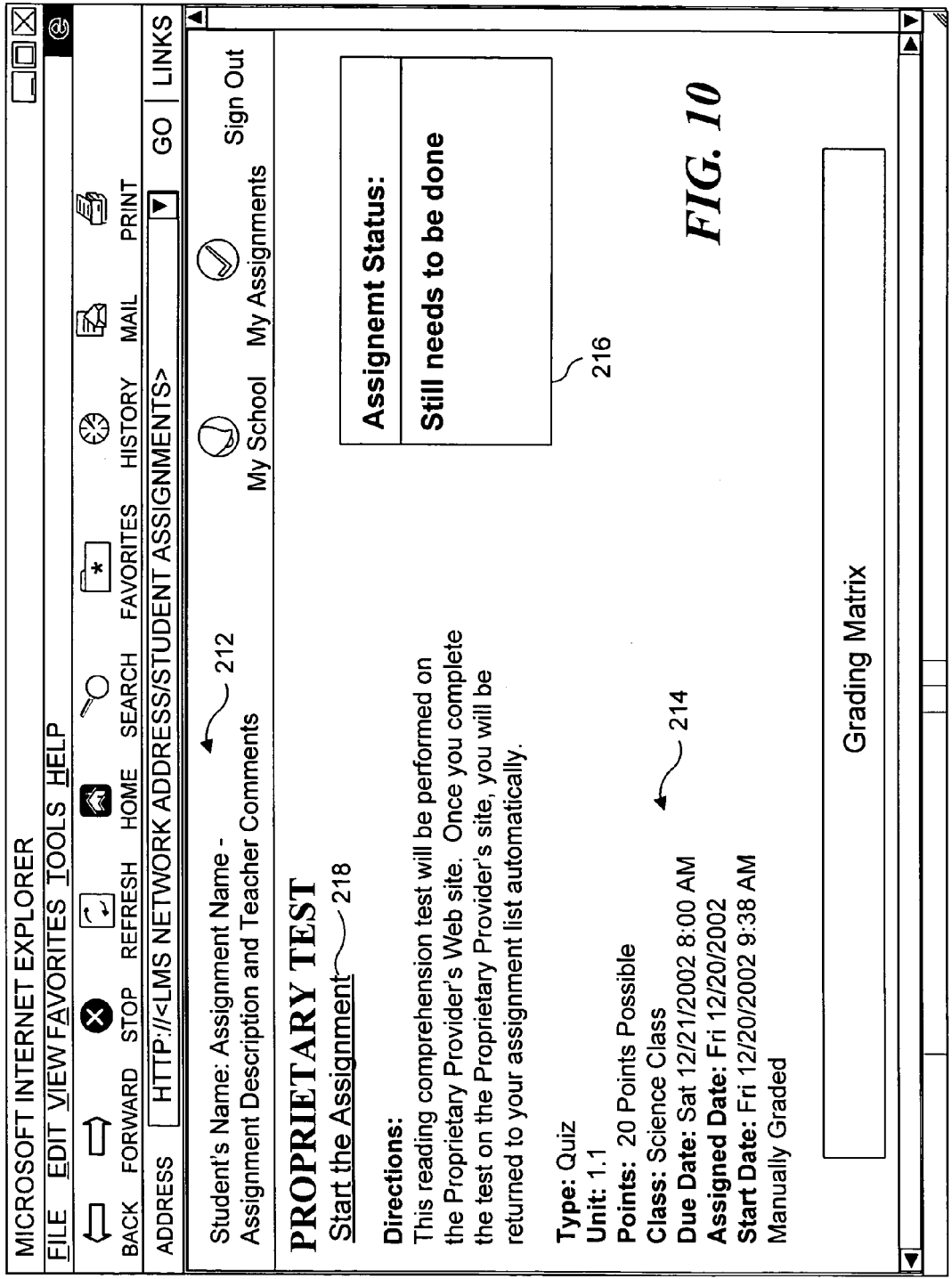

Figure 11:
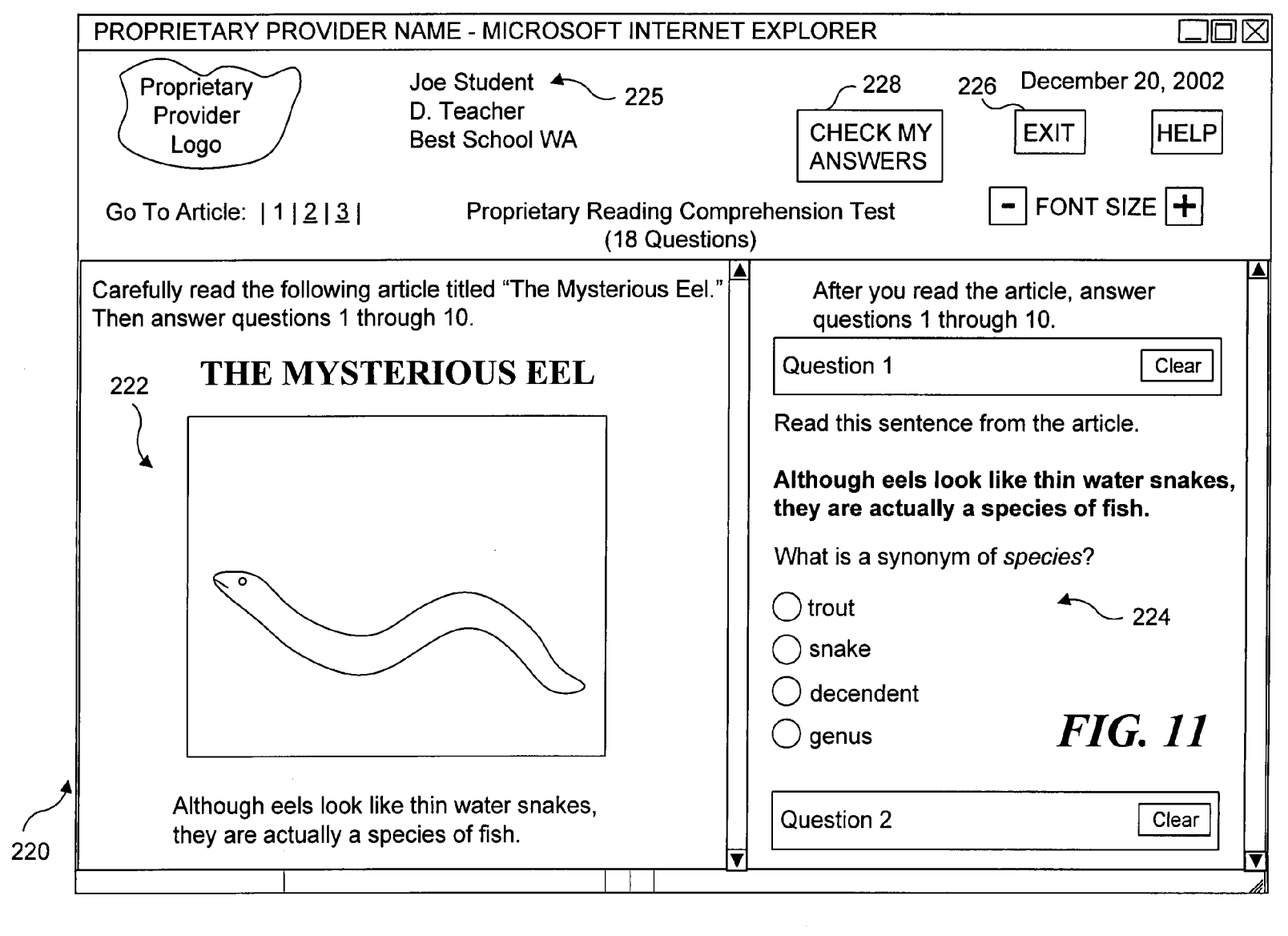

PROPRIETARY PROVIDER NAME - MICROSOFT INTERNET EXPLORER

Proprietary Provider Logo

Joe Student ← 225
D. Teacher
Best School WA

226 December 20, 2002

CHECK MY ANSWERS ← 228

EXIT    HELP

− FONT SIZE +

Proprietary Reading Comprehension Test
(18 Questions)

Go To Article: |1|2|3|

Carefully read the following article titled "The Mysterious Eel."
Then answer questions 1 through 10.

222 ↗

THE MYSTERIOUS EEL

Although eels look like thin water snakes,
they are actually a species of fish.

---

Question 1                                    Clear

After you read the article, answer
questions 1 through 10.

Read this sentence from the article.

**Although eels look like thin water snakes,
they are actually a species of fish.**

What is a synonym of *species*?  ← 224

○ trout
○ snake
○ decendent
○ genus

Question 2                                    Clear

CONTROLLING ACCESS TO PROTECTED DATA AND ASSESSMENT FUNCTIONS VIA BROWSER REDIRECTION

FIELD OF THE INVENTION

The present invention generally relates to a method and system for controlling access to proprietary data from a browser and intermediary server, and more specifically, pertains to redirecting requests and responses to and from protected data sources via a client browser to provide indirect access to proprietary learning content through a learning management system controlling student progress and a proprietary content provider that furnishes the proprietary learning content and proprietary assessment functions.

BACKGROUND OF THE INVENTION

Partnerships can often more effectively integrate and customize Web-based products and services. For example, organizations, such as retailers and schools, may create Web sites that provide access to a combination of products and services developed by the hosting organization and by selected third party suppliers. The combination of home-grown and third party products and services are often tailored to the interests of the hosting organization. Thus, a book retailer may offer its own book inventory through its Web site along with electronic products from a third party electronics retailer. Typically, this partnering is accomplished by either cross linking between one retailer's Web site and the other retailer's Web site, or arranging cross ordering of both sets of products through either retailer's Web site.

However, in some instances, one partner does not wish to openly offer its proprietary products or services through the other partner's Web site, and the other partner does not wish to enable its users to simply link to a separate, proprietary Web site. In these instances, one partner wishes to protect the proprietary aspects of its products or services, while the other partner wishes to manage its users by controlling access to, and data furnished by one or more selected proprietary providers. Nevertheless, the partners still wish to cooperate in some fashion.

A significant example of this dichotomy is a school partnering with a provider of proprietary learning content and assessment services. Schools increasingly want to provide school-provided learning content to their students through a Web site, but also wish to provide third party, proprietary learning content and testing services to their students through the same Web site to enable the school to manage student assignments and utilize standardized tests for evaluating student progress. For instance, many schools that provide education from kindergarten through $12^{th}$ grade (K-12) are gravitating towards proprietary, but standardized assessments that are provided by recognized experts in the educational assessment industry (e.g., Scantron, Princeton Review, Harcourt, etc.), rather than providing only school-developed assessments, such as traditional exams. These proprietary assessments are aligned to specific learning outcomes, and have been designed by psychometricians to accurately measure student performance against standards that are often mandated by an authority such as a state or federal government. Funding for a school is often directly tied to performance of its students on these types of assessments. Accordingly, schools are increasingly looking for complete assessment and accountability solutions that provide standardized and aligned assessments from a recognized assessment provider.

There are a limited number of recognized assessment providers involved in K-12 education that have sufficient credibility and name recognition to make a complete assessment and accountability solution acceptable for wide use. These specialized providers consider their grading algorithms and assessment items to be valuable intellectual property. They will not allow their assessment software and algorithms to be disclosed and used outside their control. However, these providers also recognize the increasing importance of electronic learning platforms in their marketplace, and desire a way for communicating with school Learning Management Systems (LMSs), while protecting the providers' proprietary information and intellectual property.

Conversely, schools want to maintain control over the learning platform and the reporting functionality regarding their own students. Currently, school LMSs do not enable a school to centrally manage assignments and testing results, while at the same time, enabling third party providers to maintain secure control over their proprietary content and testing services. Instead, content is either local to the LMS, or when hosted remotely by a proprietary provider, is presented through simple Web links or framed in a browser frameset or iframe.

Attempts have been made to develop standards to allow third party providers to communicate with an LMS both to get information about a student (e.g., a proprietary test assigned to the student by the LMS) and to return information to the LMS about the student's performance. A notable standard is the Sharable Content Object Reference Model (SCORM) from the Advanced Distributed Learning Initiative, sponsored by the U.S. Department of Defense (http://www.adlnet.org). The SCORM defines a Web-based learning "Content Aggregation Model" and "Run-Time Environment" (RTE) for learning objects that enable interoperability, accessibility, and reusability of Web-based learning content. However, the SCORM RTE does not allow for cross-domain communication between content and LMS. Thus, content using the SCORM RTE must be hosted on the same domain as the LMS itself. This requires proprietary providers to sacrifice the proprietary nature of their services. Similarly, another standard, known as the Instructional Management Systems (IMS) Question and Test Interoperability (QTI) specification from IMS Global Learning Consortium, Inc. (http://www.imsglobal.org), enables the interchange of assessment items between systems. However, again, because it is a standard, proprietary providers must modify and/or divulge some of their proprietary techniques. For example, the proprietary providers may have to disclose some of their grading mechanisms, which they consider their proprietary information and part of their intellectual property. As a result, proprietary assessment providers resist these standards. Other results-reporting solutions such as direct server-to-server communication suffer from additional security-related issues. For example, if a school server is to be exposed via a Web Services application programming interface (API) to a content provider's server, it is often necessary to configure the school's proxy server specially for that content provider. This operation requires a school or district information technology (IT) department to do special configuration for each content provider. Clearly, a need exists for an alternative that will protect proprietary systems by allowing proprietary providers to host their own proprietary content and services, yet report results back to an LMS for customizing and managing student assignments and progress.

SUMMARY OF THE INVENTION

The present invention is directed to a method and system for enabling an organization such as a learning institution to control user assignments such as student learning assignments and assessment results while enabling a proprietary provider to maintain control over network distribution of proprietary content comprising the learning assignments and to maintain control over use of proprietary assessment functions that evaluate the student's performance of the assignments. More specifically, the method and system of the present invention enable indirect access to proprietary learning content such as text, graphics, audio, etc. as well as assessment functions over an electronic network. The indirect access is implemented with a browser through an intermediary LMS that redirects the browser to a network node hosting the proprietary learning content and assessment functions. The browser is provided with a link to the LMS rather than to the protected data. Upon activating the link, the LMS returns hidden information about the learning institution, the individual student, the assignment, and the proprietary provider to the browser. The LMS also returns a pointer to the proprietary learning content and assessment functions. The browser evaluates the pointer without the user's knowledge of the hidden information and automatically redirects the browser to the proprietary learning content and assessment functions. The proprietary provider then uses the hidden information to control distribution of the proprietary learning content to the browser and controls the student's interaction with the proprietary learning content to accomplish the assignment. When the student performs the assignment, information is submitted to the proprietary provider, which performs proprietary assessment functions and returns only results data to the LMS through the browser.

Preferably, the link to the LMS also includes a uniform resource locator (URL) identifying the location of the proprietary learning content so that the request from the browser to the LMS for the proprietary learning content identifies the location to which the LMS should redirect the browser. The LMS embeds the URL to the proprietary learning content into a message with the hidden information and sends the message to the browser, which automatically redirects to the URL of the proprietary learning content. The proprietary provider can then perform any of its own validation steps before transferring any of the proprietary learning content to the browser. Thus, an organization controlling the LMS can manage the student user's access to the proprietary learning content, yet the proprietary provider maintains control over distribution of the proprietary learning content to the browser. It appears to the student that the browser has direct access to the proprietary learning content.

The student can stop interacting with the proprietary learning content and return to the LMS by selecting a quit link comprising a URL to the LMS. Alternatively, the student can submit answers to questions asked in the proprietary learning content or submit other information to the proprietary provider. The proprietary provider applies its proprietary assessment functions or other functions to produce results data. The results data are preferably digitally signed and/or encrypted, and are included in a hidden form that is communicated to the browser for automatic redirection to the LMS.

Another aspect of the invention is directed to a memory medium storing machine instructions that cause a processor to perform the steps described above and discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 10 is a screen shot of an example assignment information page that the browser displays to a student user to provide preliminary information about a remote proprietary assignment; and FIG. 11 is a screen shot of an exemplary proprietary content page that the browser displays to a student user for performing an assignment.

DESCRIPTION OF THE PREFERRED EMBODIMENT

Computing Environment

Figure 1:
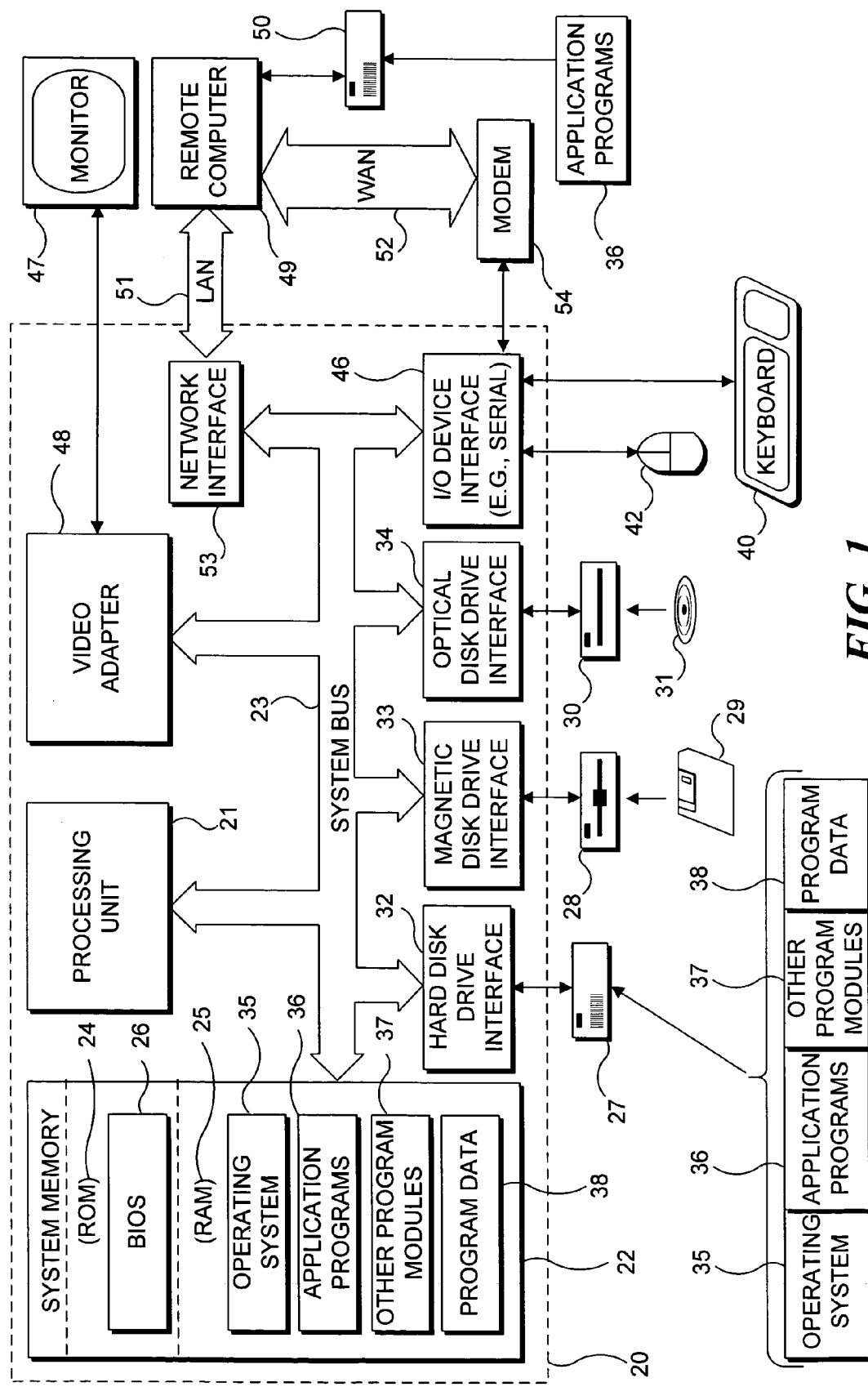
FIG. 1 is a functional block diagram illustrating an exemplary computing system for use with the present invention and includes a general purpose computing device in the form of a conventional personal computer (PC) acting as a server computer.

FIG. 1 and the following discussion are intended to provide a brief, general description of a suitable computing environment in which the present invention may be implemented. Although not required, the present invention will be described in the general context of computer executable instructions, such as program modules, which are executed by a personal computer or a server computer. Generally, program modules include routines, programs, objects, components, data structures, etc. that perform particular tasks or implement particular abstract data types. A preferred embodiment is described below in the context of a learning management system, such as Microsoft Corporation's CLASS SERVER™ software package, for distributing and tracking proprietary learning content, which is provided by a separate server computer. However, those skilled in the art will appreciate that the present invention may be practiced with other programs that coordinate access through a browser to secure data and programs on a remote device. Those skilled in the art will also appreciate that the present invention may be practiced on a single computer or with other computer system configurations, including hand held devices, multiprocessor systems, microprocessor based or programmable consumer electronic devices, network personal computers, minicomputers, mainframe computers, and the like. Preferably, the present invention is practiced in distributed computing environments, where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional server computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within server computer 20, such as during start up, is stored in ROM 24. Server computer 20 further includes a hard disk drive 27 for reading from and writing to a hard disk, not shown, a magnetic disk drive 28 for reading from or writing to a removable magnetic disk 29, and an optical disc drive 30 for reading from or writing to a removable optical disc 31, such as a CDROM or other optical media Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer readable media provide nonvolatile storage of computer readable machine instructions, data structures, program modules and other data for server computer 20. Although the exemplary environment described herein employs a hard disk, removable magnetic disk 29, and removable optical disc 31, it will be appreciated by those skilled in the art that other types of computer readable media, which can store data that are accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disc 31, ROM 24 or RAM 25, including an operating system 35, one or more application programs 36, other program modules 37, and program data 38. A user may enter commands and information into server computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, server computers may be coupled to other peripheral output devices (not shown), such as speakers (through a sound card or other audio interface - not shown) and printers.

Server computer 20 may operate in a networked environment using logical connections to one or more remote computers, such as a remote computer 49. Remote computer 49 may be a personal computer (e.g., running a browser), another server, a router, a network personal computer, a peer device, or other common network node, and typically includes many or all of the elements described above in connection with server computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, server computer 20 is connected to LAN 51 through a network interface or adapter 53. When used in a WAN networking environment, server computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to server computer 20, or portions thereof, may be stored in the remote memory storage device. It will be appreciated that the network connections shown are exemplary and other means of establishing a communications link between the computers may be used.

Preferred Embodiment

Figure 2:
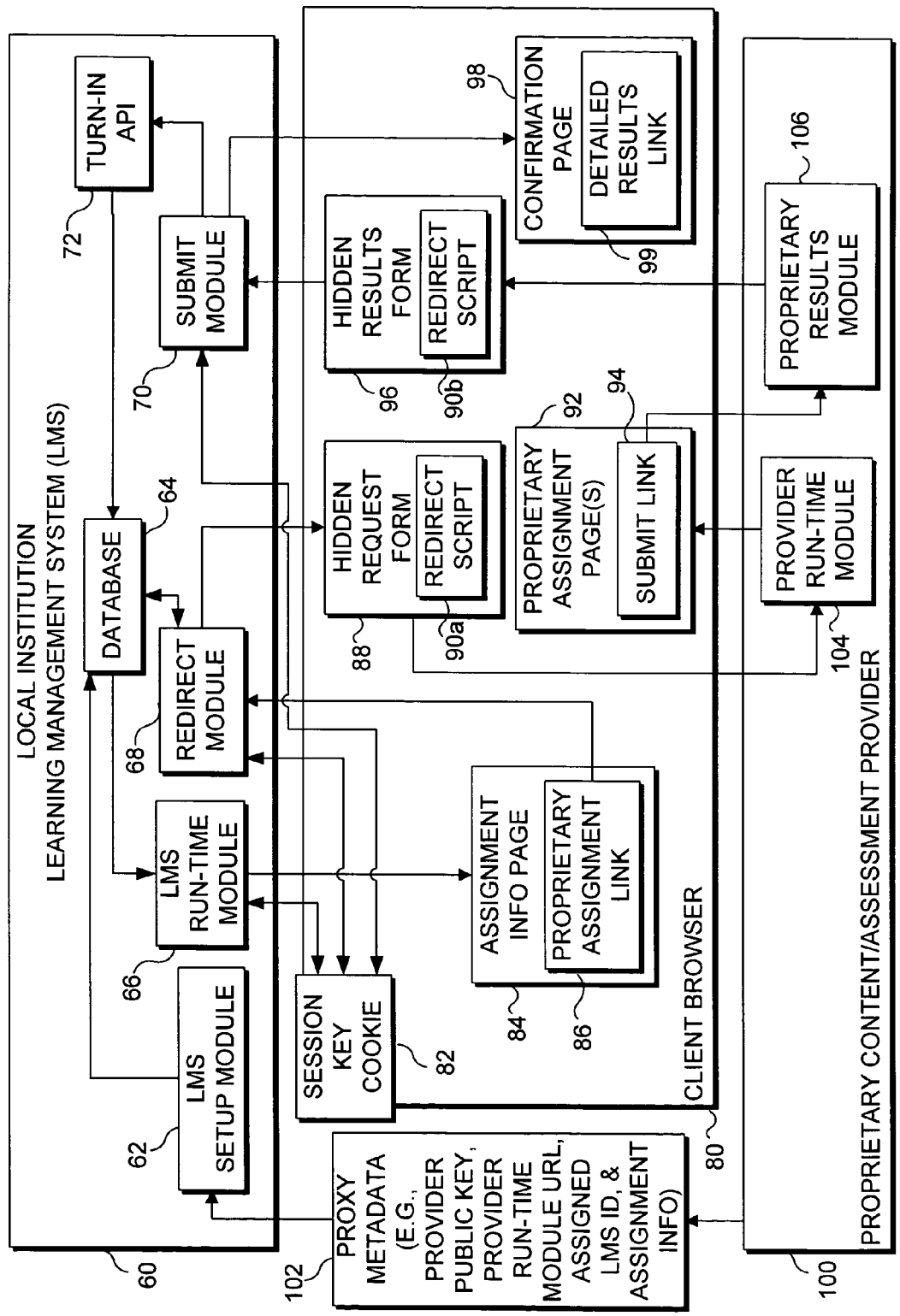
FIG. 2 is a functional block diagram illustrating a preferred architecture of client and server systems, program modules, data, and relationships between the above elements for controlling access to proprietary data.

FIG. 2 is a functional block diagram illustrating a preferred architecture of client and server systems, program modules, data, and relationships between the above elements for controlling access to proprietary data. Preferably, a local institution LMS 60 interacts with a client browser 80 to control access to proprietary data available from a proprietary content and assessment provider 100 (sometimes referred to herein simply as a "proprietary provider"). LMS 60 is preferably implemented on a server computer by a learning institution such as a public school district. Client browser 80 is preferably implemented on a personal computer by a student of the learning institution. Proprietary provider 100 is preferably implemented on a separate server computer operated by a recognized expert in educational content or standardized testing. LMS 60, client browser 80, and proprietary provider 100 communicate over an electronic network such as an intranet or the Internet. However, LMS 60 does not normally communicate with proprietary provider 100 except to exchange setup information. To arrange for access to the proprietary data, proprietary provider 100 sends proxy metadata 102 to LMS 60, preferably in an out-of-band communication. Proxy metadata 102 comprise communication information and preliminary content information. For example, proxy metadata 102 include a URL identifying a location for accessing the proprietary data and the proprietary provider's public key for verifying the source of results returned from proprietary provider 100. Preliminary content information includes preview descriptions of assignments and assessments, assignment identifiers, and other information used to select portions of the proprietary data. Proxy metadata 102 is decoded, parsed, and otherwise processed by an LMS setup module 62 and stored in a database 64. Further details regarding proxy metadata 102 are discussed below with regard to FIGS. 3 and 10. Those skilled in the art will recognize that LMS 60 may provide similar preliminary communication information, instructions, or other data to proprietary provider 100 through a setup process.

LMS 60 also includes an LMS run-time module 66 that communicates with client browser 80 to enable a student to access and manage local and proprietary educational assignments through LMS 60. LMS run-time module 66 preferably authenticates a student user of client browser 80 via a conventional session key cookie 82. Those skilled in the art will recognize that session key authentication can alternatively be accomplished by a central communication module (not shown) that communicates with all other modules of LMS 60. LMS run-time module 66 also communicates with database 64 to obtain information about educational assignments available to and/or assigned to a student. Information regarding a remote proprietary assignment is prepared and communicated by LMS run-time module 66 to client browser 80 as an assignment information page 84. Assignment information page 84 preferably includes a preview description and other information regarding the remote proprietary assignment and is rendered by client browser 80 to display the assignment preview information and a proprietary assignment link 86 that a user may select to initiate a request for the proprietary assignment from proprietary provider 100. Those skilled in the art will recognize that this data may be provided by the proprietary provider during the out of band setup process, or at runtime via an HTTP request (for example in a frameset or an iframe).

User selection of proprietary assignment link 86 causes client browser 80 to send a request to a redirect module 68 of LMS 60 for access to the proprietary assignment. Redirect module 86 preferably comprises an active server page and any application programming interfaces (APIs) needed to interact with other program modules and/or databases. Redirect module 68 (or a central authentication module) can authenticate client browser 80 via session key cookie 82 before accessing database 64 for student identifiers and other information needed to obtain the proprietary assignment from proprietary provider 100.

With the information from database 64, redirect module 68 generates and outputs a hidden request form 88 to client browser 80. Hidden request form 88 includes a redirect script 90a, such as a JavaScript function, an applet, or other conventional program module that can be executed by a browser. Upon rendering hidden request form 88, client browser 80 executes redirect script 90a, which immediately causes client browser 80 to submit data from hidden request form 88 to a provider run-time module 104 of proprietary provider 100. This hidden redirection process enables a student user of LMS 60 to access proprietary assignments from proprietary provider 100 without having to separately access proprietary provider 100 and without requiring proprietary provider 100 to release proprietary data to LMS 60 for distribution to students.

Provider run-time module 104 preferably comprises one or more HTML pages, active server pages, APIs, databases, and any other program modules needed by proprietary provider 100 to manage interaction with client browser 80 while the student interacts with proprietary assignments. Provider run-time module 104 obtains the proprietary assignment data requested through hidden request form 88 and provides client browser 80 with one or more proprietary assignment pages 92. Proprietary assignment pages 92 comprise text, graphics, audio, and/or other proprietary content. Proprietary assignment pages 92 can also comprise form elements that enable the student user to enter answers to questions or other responses to be assessed by proprietary provider 100. Client browser 80 renders proprietary assignment pages 92, at least one of which includes a submit link 94 or other submit user interface element such as a button. When the user has completed the proprietary assignment and selected submit link 94, client browser 80 submits the assignment data entered by the user to a proprietary results module 106. Proprietary results module 106 also comprises an active server page, APIs, databases, and other program modules used by proprietary provider 100 to perform its proprietary assessment functions. As illustrated, proprietary results module 106 is preferably operated under control of proprietary provider 100; however, proprietary results module 106 could alternatively be operated under control of a separate system (not shown) that is associated with proprietary provider 100.

Based on the assignment data submitted by the student via proprietary assignment pages 92, proprietary results module 106 produces a hidden results form 96, which is communicated to client browser 80. In a manner similar to hidden request form 88, hidden results form 96 includes a redirect script 90b that is executed by client browser 80 upon rendering hidden results form 96. Redirect script 90b causes client browser 80 to immediately submit hidden results data to a submit module 70 under control of LMS 60. This process of redirecting hidden results data enables proprietary provider 100 to maintain control over proprietary techniques for analyzing and reporting the student's performance on proprietary tests included in the proprietary assignment pages. In this way, learning institutions can use their own LMS to manage student results from standardized proprietary tests without requiring control over the standardized proprietary tests.

Submit module 70 is preferably an active server page, but also includes APIs or other program modules needed to perform preliminary processing on results data. Submit module 70 may need to authenticate the user via session key cookie 82 prior to further processing of the hidden results. Once authenticated, submit module 70 communicates the hidden results to a turn-in API 72, which verifies the source of the hidden results and stores the results in database 64. Submit module 70 also produces a confirmation page 98 that is communicated to client browser 80 to inform the student that the results were accepted and stored. Confirmation page 98 can also include a detailed results link 99 that enables the student user to access detailed information from proprietary provider 100 regarding the student's performance on the test material in the proprietary assignment. Preferably, detailed results link 99 points to redirect module 68 or a similar redirection module under control of LMS 60 to redirect a hidden detailed results form (not shown) to proprietary provider 100 in a manner similar to that described above for hidden request form 88 and hidden results form 96. Further detail regarding the program modules, data, and relationships illustrated in FIG. 2 will become apparent from the description of logic flow and the examples provided below.

Figure 3:
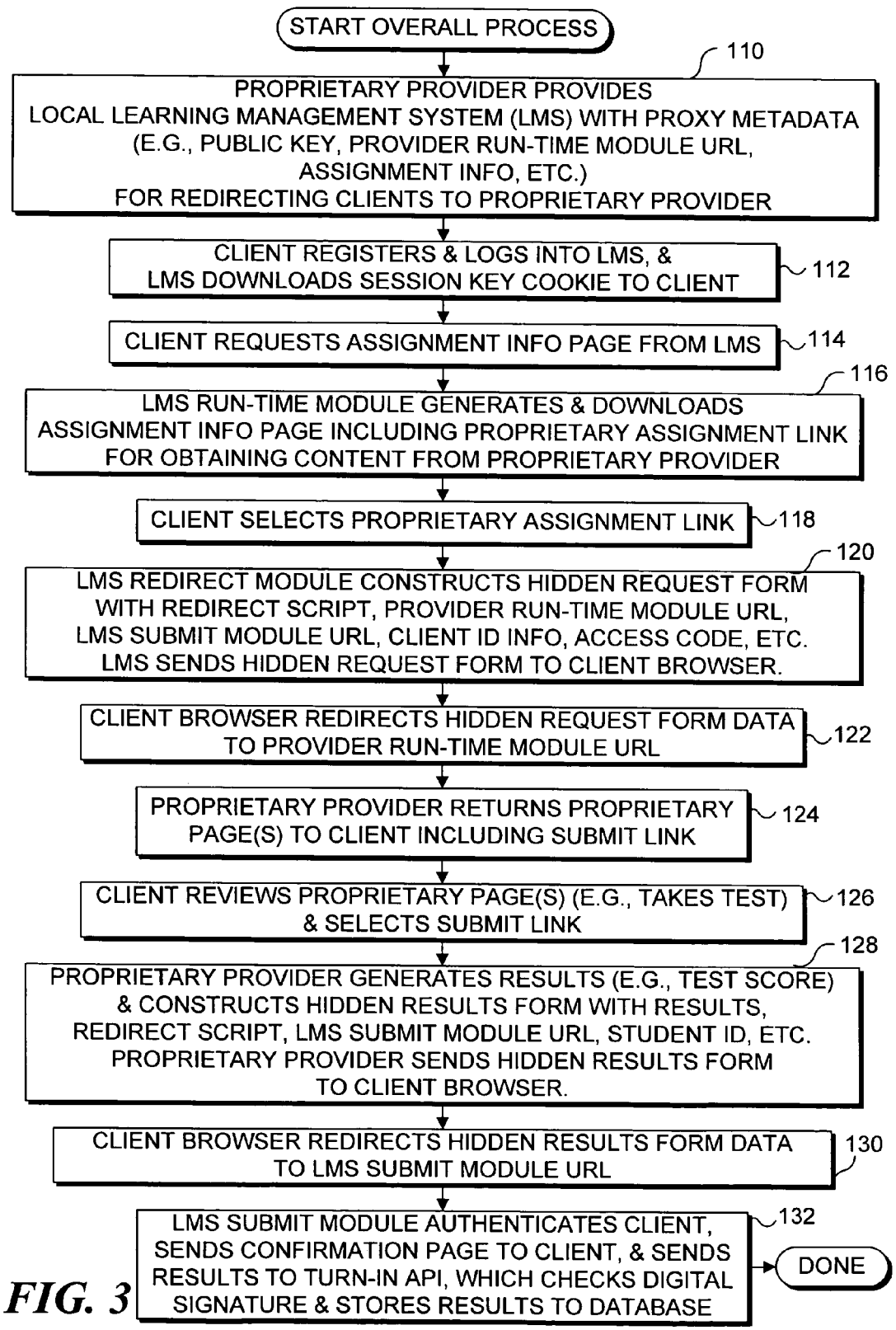
FIG. 3 is a flow diagram illustrating high-level logic of an overall process for controlling access to protected proprietary data of a proprietary provider by a browser and LMS.

FIG. 3 is a flow diagram illustrating high-level logic of an overall process for controlling access to protected propriety data of a proprietary provider from a browser and LMS. At a step 110, the proprietary provider provides the LMS with proxy metadata through a setup or out-of-band communication to the LMS. As indicated above, the proxy metadata preferably comprise the proprietary provider's public key, a URL to the proprietary provider's run-time module, an LMS ID assigned by the proprietary provider to recognize communication from the LMS, and other information needed to facilitate communication between the proprietary provider and the LMS. The proxy metadata also preferably includes information regarding assignments and/or other proprietary data accessible to the LMS from the proprietary provider. For example, assignment information can include a unique assignment ID for each assignment made available to the LMS by the proprietary provider, an access code to access one or more of the assignments, a short description of each assignment, directions for performing the assignments, maximum possible points available for each assignment, and any other preliminary information about each assignment that the proprietary provider wishes to release to the LMS.

At a step 112, a user registers with and logs into the LMS. Most of the discussion below is directed to the example of a student user who accesses proprietary assignments through the LMS with a client browser. However, the user can instead be a teacher who wishes to review the proprietary assignments before assigning the proprietary assignments to students, or to access other proprietary data that are not available to students. The user may instead be an educational administrator who wishes to access proprietary administrative data from the proprietary provider via a client browser and the LMS. Those skilled in the art will recognize that many other types of users may access protected data and/or services through an intermediary server and a client browser. When a user registers with the LMS, the LMS may assign a student ID or other permanent identifier appropriate to that specific user. Additionally, when the user logs into the LMS, the LMS preferably downloads a session key to the client and sets a cookie for use in authenticating communications from the client. For a student user, the LMS also preferably downloads a student home page that provides an index of assignments that the student is expected to perform. This list of assignments can identify locally produced learning resources that are distributed and controlled entirely by the LMS. The list of assignments also may include one or more remote learning resources, which are proprietary assignments distributed and controlled by one or more proprietary providers. Each entry in the list of a local and remote assignments comprises a link to the corresponding local or remote assignment. When the user selects one of the listed remote assignments, the client browser sends to the LMS a request for an assignment information page, at a step 114.

At a step 116, the LMS run-time module accesses information about the selected remote proprietary assignment from the LMS database and generates an assignment information page with the description, directions, and other information about that proprietary assignment. Included in the assignment information page is a proprietary assignment link that comprises a URL pointing to the LMS redirect module. Further details regarding the assignment information page and proprietary assignment link are discussed below with regard to FIG. 4.

At a step 118 of FIG. 3, the user selects the proprietary assignment link, causing the client browser to request initiation of the LMS redirect module. The LMS redirect module obtains information about the student user from the LMS database and constructs a request form, at a step 120, which will redirect the client browser to the proprietary provider. Preferably, the request form comprises a hidden HTML form. As indicated above, the LMS redirect module includes a redirect script in the hidden request form that is executed by the client browser to perform the redirection operation. The LMS redirect module also includes in the hidden request form, the URL to the provider run-time module where the client browser can redirect the hidden request form. The LMS redirect module further includes in the hidden request form, a URL to the LMS submit module so that the proprietary provider knows where to send the results. The hidden request form preferably also includes identifiers such as the student's ID, the proprietary assignment access code, and other information that the proprietary provider may need. After constructing the hidden request form, the LMS redirect module sends the hidden request form to the client browser. Further details regarding step 120 are provided below with regard to FIG. 5.

At a step 122 of FIG. 3, the client browser renders the hidden request form, causing the browser to redirect the hidden request form data to the proprietary provider run-time module. At a step 124, the proprietary provider run-time module generates and returns one or more proprietary pages to the client browser. Interaction with the proprietary pages is then controlled by the proprietary provider. At least one of the proprietary pages also includes the submit link that points to the proprietary results module for generating and sending results back to the LMS. Further details regarding step 124 are provided below with regard to FIG. 6.

At a step 126 of FIG. 3, the student user reviews the proprietary pages and preferably performs the proprietary assignment by entering answers or other information through form elements of the proprietary pages. The student user then selects the submit link to submit the student's answers and other information to the proprietary results module. At a step 128, the proprietary provider applies its proprietary assessment techniques to generate results, such as a test score, statistical data, and/or other proprietary data. The proprietary provider also constructs a results form including the results and another redirect script for causing the browser to redirect the results to the LMS. Preferably, the results form comprises a hidden HTML form. Accordingly, the hidden results form also includes the URL to the LMS submit module, which is the delivery destination for the proprietary results. The hidden results form also preferably includes the student ID and any other information needed by the LMS. Further details regarding step 128 are provided below with regard to FIG. 7.

At a step 130 of FIG. 3, the client browser receives and renders the hidden results form, thereby executing the redirect script that causes the client browser to submit the hidden results form data to the LMS submit module. At a step 132, the LMS submit module authenticates the client and relays the results to the turn-in API, which preferably verifies a digital signature applied to the results data by the proprietary provider, and stores the results in the LMS database. If the turn-in API executes properly, the LMS submit module sends a confirmation page to the client browser. Further details regarding step 132 are provided below with regard to FIGS. 8 and 9.

Figure 4:
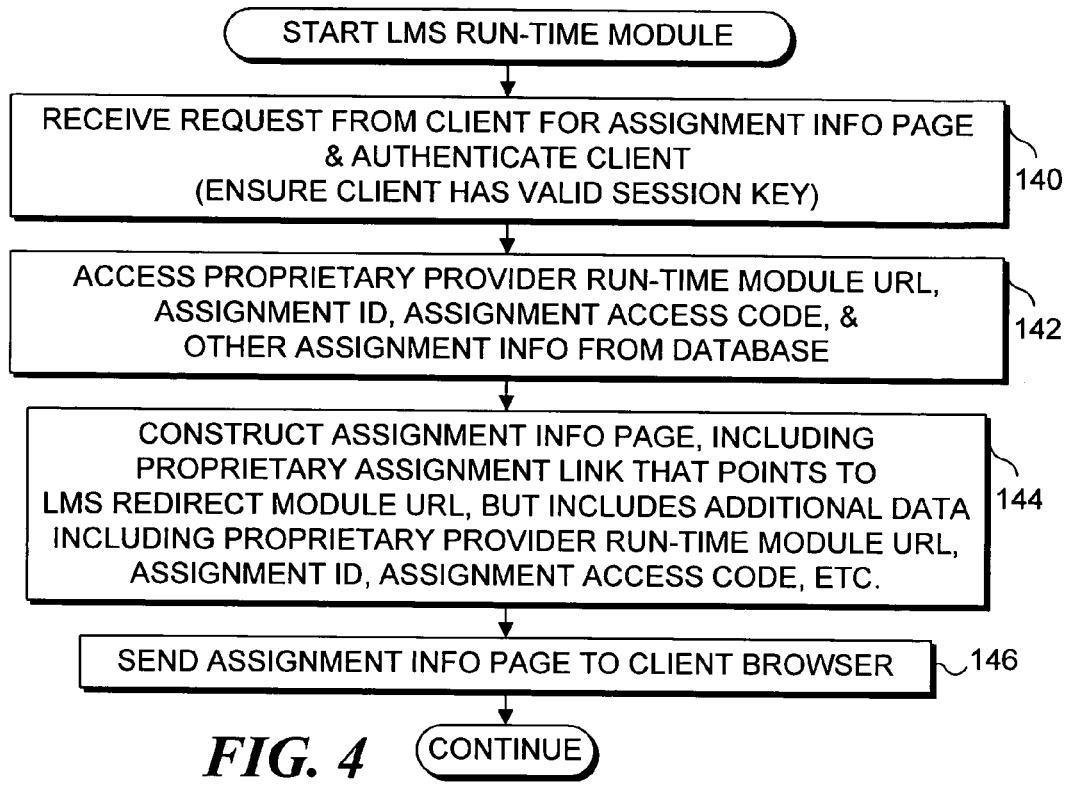
FIG. 4 is a flow diagram illustrating additional detailed logic performed by the LMS run-time module.

FIG. 4 is a flow diagram illustrating additional detailed logic performed by the LMS run-time module. At a step 140, the LMS run-time module receives a request from the client browser for an assignment information page about a remotely available proprietary assignment selected by the user from the list of assignments available to the user. Preferably, the received request includes an assignment identifier, an access code, and/or other information needed by the LMS to access the desired proprietary assignment. The LMS run-time module also preferably authenticates the session key stored on the client to ensure that the client has a currently valid session key. At a step 142, the LMS run-time module accesses the LMS database to obtain the URL that identifies the address of the proprietary provider run-time module. Alternatively, this URL to the proprietary provider run-time module could have been included in the assignment information page and sent with the request from the client browser when the user selected the link to the desired proprietary assignment from the list of assignments available to the user. Similarly, the LMS run-time module can parse the request for the assignment ID and assignment access code.

At a step 144, the LMS run-time module constructs the assignment information page to include the assignment information discussed above and the proprietary assignment link that identifies the URL for the LMS redirect module. Also included is the brief description of the assignment and other assignment information that is preferably obtained from the LMS database, which was populated with assignment information from the proprietary provider in the out-of-band setup communication. Preferably, the assignment information page also includes the URL for the proprietary provider run-time module so that the LMS redirect module does not have to separately retrieve this URL. At a step 146, the LMS run-time module sends the assignment information page to the client browser for rendering to the user.

Figure 5:
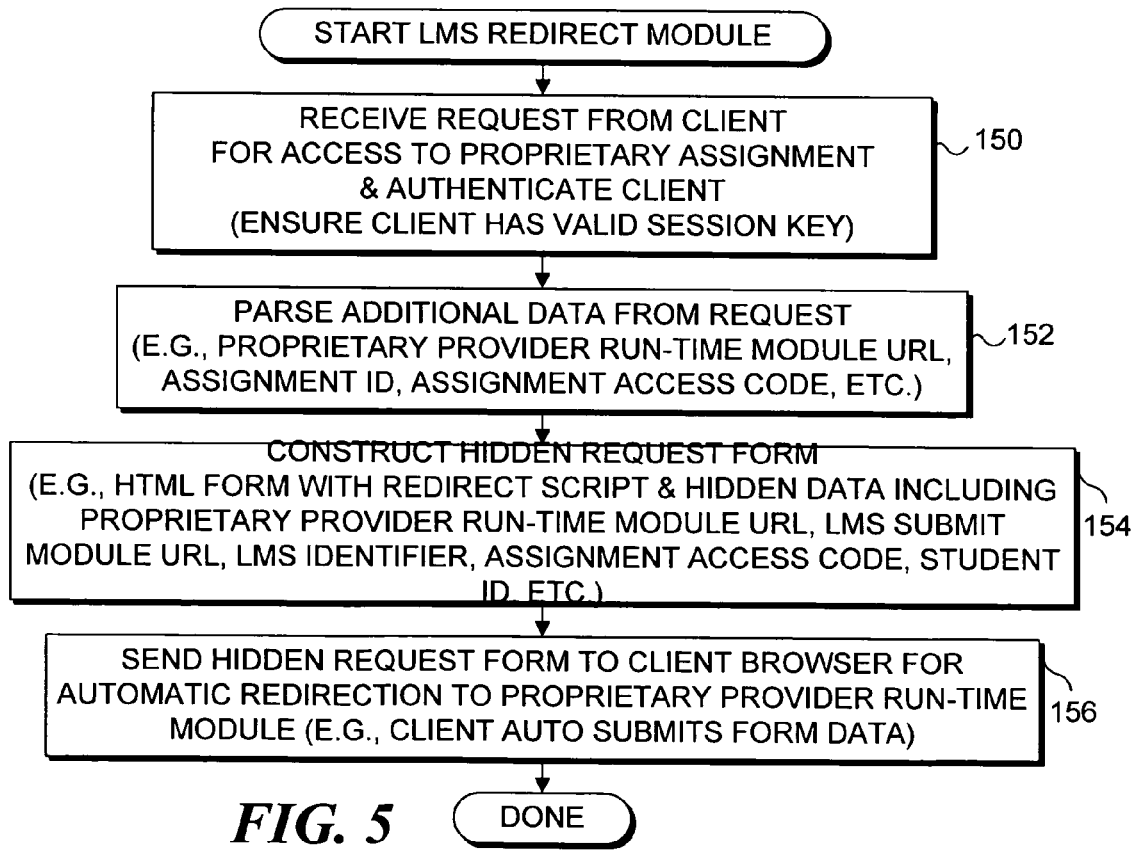
FIG. 5 is a flow diagram illustrating additional detailed logic performed by the LMS redirect module.

FIG. 5 is a flow diagram illustrating additional detailed logic performed by the LMS redirect module. At a step 150, the LMS redirect module receives a request from the client browser to access the proprietary assignment described in the assignment information page. The request results from the user's selection of the proprietary assignment link in the assignment information page. The LMS redirect module also preferably authenticates the client to ensure that the client has the current valid session key. At a step 152, the LMS redirect module parses the request for the other data needed to access the proprietary assignment. For example, the LMS redirect module parses out the URL to the proprietary provider run-time module, the assignment ID, the assignment access code, and any other information needed to access the proprietary assignment. This data could alternatively be stored in the LMS database from which the LMS redirect module could obtain the access data.

At a step 154, the LMS redirect module retrieves information from the database and constructs the hidden request form to be sent to the client browser. Preferably, the hidden request form comprises a hypertext markup language (HTML) form that includes the redirect script and other hidden form elements needed by the proprietary provider. Samples of such form elements are listed in Table 1.

TABLE 1

Sample Form Elements Sent By LMS Redirect Module to Proprietary Provider

| Form Element Name | Description | Defined for CSView |
|---|---|---|
| Class Server View (CSView) | The view that the proprietary provider (e.g., publisher) should show. Can be one of: Preview - if the remote proprietary content LR is being previewed by a teacher Assigned - if the remote proprietary content LR is being completed by a student Grading - if the remote proprietary content is being viewed by a teacher during grading Review - if the remote proprietary content has been graded and returned to the student | All Views |
| CSPaperID (i.e. Assignment ID) | A locally unique 64-bit identifier for the assignment instance (a.k.a. "Paper"). This identifier is always the same for a given student taking a given assignment at a given school | Assigned Grading Review |
| CSSchoolName | Human-readable name of the school, e.g. "Southridge Middle School". This information is provided only for display purposes, can change at any time, and is not unique. | All Views |
| CSSchoolGUID (i.e., LMS ID) | Globally unique identifier that Class Server assigned to the school, e.g. 4cbcbed7-4884-44eb-96e0-76d8cc7f6a77 | All Views |
| CSClassName | Human-readable name of the class, e.g. "4th Period Algebra". This information is provided only for display purposes, can change at any time, and is not unique. | Assigned Grading Review |
| CSStudentName | Human-readable full name of the student viewing the content, e.g. "Joe Smith". This information is provided only for display purposes, can change at any time, and is not unique. | Assigned Grading Review |
| CSStudentID | A locally unique 64-bit identifier that Class Server assigned to the student. | Assigned Grading Review |
| CSReturnURL | The URL to use to return the student back to their assignment within Class Server without submitting the paper to the teacher. The publisher should not make any assumptions about the format or structure of this URL. The URL format may change without notice. Note that this URL will fail if the user's class server credentials (stored within a browser session cookie) have timed out. | Assigned Review |
| CSSubmitURL | The URL to use to cause the paper to be "turned in" to the teacher. The publisher web site can post curriculum standards grading information about the paper to this URL via XML. The publisher should not make any assumptions about the format or structure of this URL. The URL format may change without notice. As an implementation detail, this URL should include the PaperID as a query parameter so that SubmitRemoteContent.aspx can determine the PaperID when the paper is turned in. | Assigned |

In particular, the LMS redirect module includes the URL to the LMS submit module and a URL that takes the user back to the LMS without submitting the user's answers to the proprietary provider.

At a step 156, the LMS redirect module sends the hidden request form to the client browser for automatic redirection to the proprietary provider run-time module. Those skilled in the art will recognize that other means can be used to automatically redirect the hidden data to the proprietary provider run-time module. For example, the hidden data can be included in message headers, alternate script variables, hidden frame data, or other hidden data types.

Figure 6:
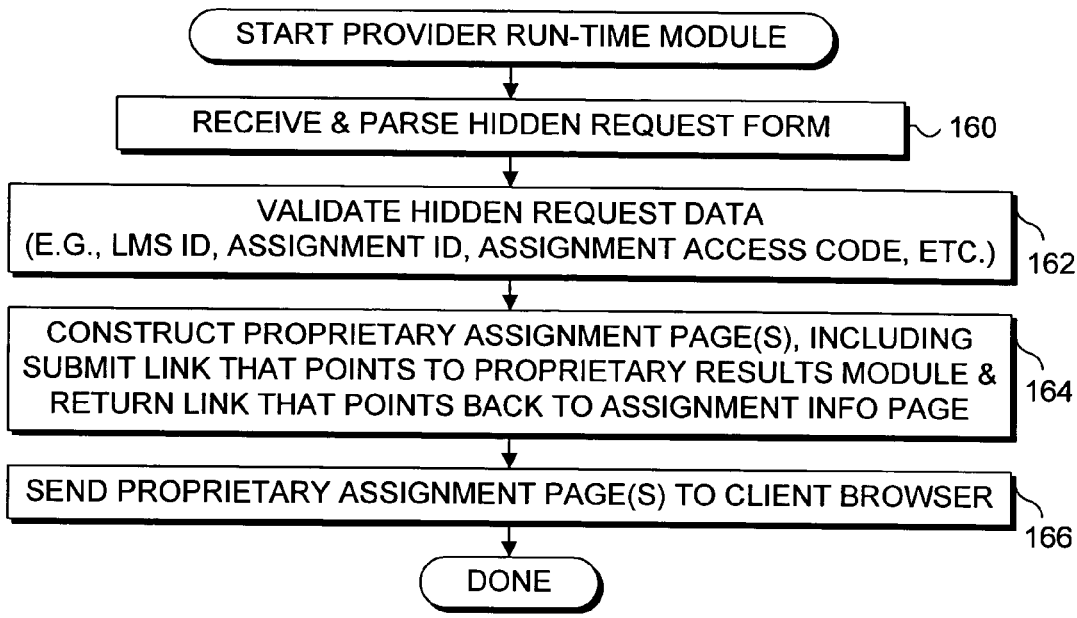
FIG. 6 is a flow diagram illustrating additional detailed logic of the proprietary provider run-time module.

FIG. 6 is a flow diagram illustrating additional detailed logic performed by the proprietary provider run-time module. At a step 160, the proprietary provider run-time module receives and parses the hidden request form data that was redirected by the client browser. The proprietary provider may optionally also perform a separate authentication of the client based on a separate session key, or based on information provided in the hidden request form. Similarly, at a step 162, the proprietary provider run-time module preferably validates the hidden request form data to ensure that the LMS is in good standing with the proprietary provider and the LMS is requesting a currently valid proprietary assignment.

At a step 164, the proprietary provider run-time module constructs one or more proprietary assignment pages for the user to review and/or to perform a proprietary test. As indicated above, the proprietary assignment pages include a return link directed to a URL that will return the user to the LMS without submitting the user's test data and include the submit link that points to the proprietary results module. Recall that the URL to the LMS submit module was passed to the proprietary provider via the hidden request form. Thus, the submit link also preferably includes the URL to the LMS submit module, so that the proprietary results module does not need to separately retrieve the address to the LMS submit module. At a step 166, the proprietary provider run-time module sends the proprietary assignment pages to the client browser. While interacting with the proprietary assignment pages, the client browser does not communicate with the LMS (unless the user selects the link to direct the user back to the LMS without submitting the user's test data).

Figure 7:
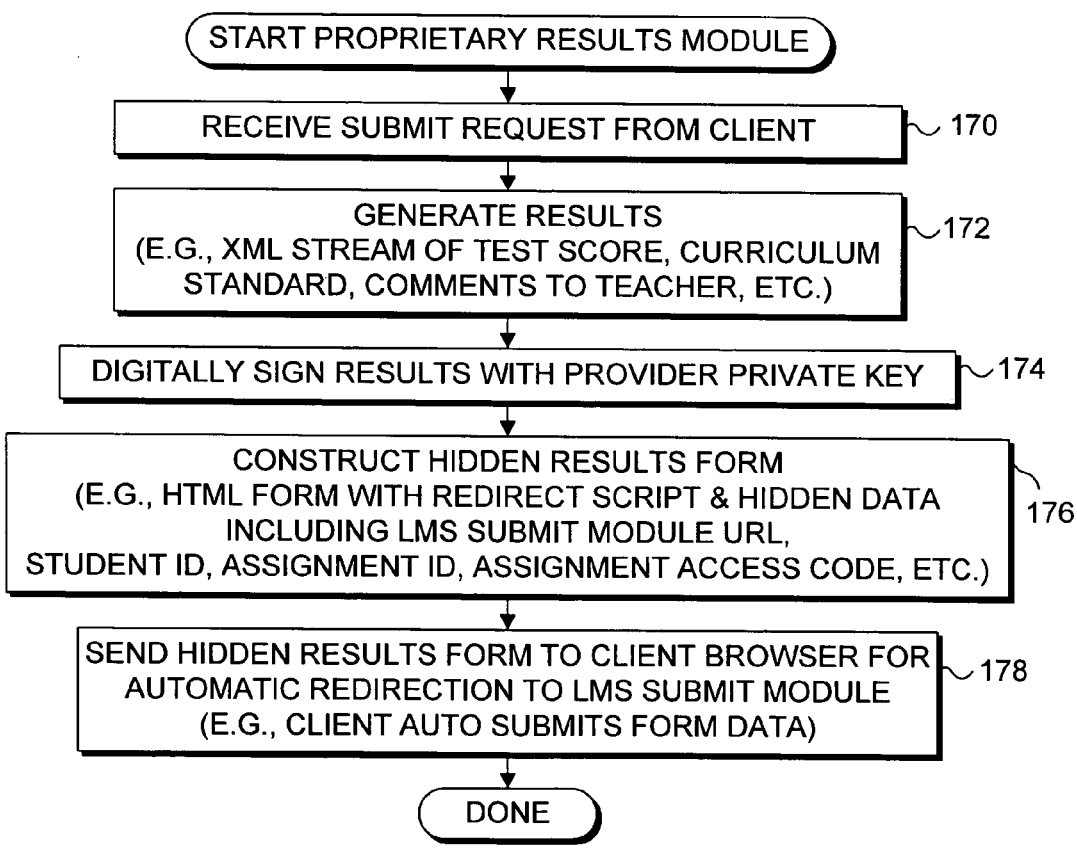
FIG. 7 is a flow diagram illustrating additional detailed logic performed by the proprietary results module.

FIG. 7 is a flow diagram illustrating additional detailed logic performed by the proprietary results module. At a step 170, the proprietary results module receives a submit request from the client browser as a result of the user selecting the submit link. The proprietary results module can optionally perform an authentication of the client as suggested above. The proprietary results module also parses the received submit request for the user's test answers. At a step 172, the proprietary results module applies its proprietary assessment algorithms to generate results indicating the user's performance. For example, the results may comprise an XML stream of test score data, curriculum standards, comments to the teacher, or other data that the proprietary provider deems valuable to the LMS. The results can alternatively simply comprise an indication that the student received the assignment pages for review.

At a step 174, the proprietary results module preferably digitally signs the results with the proprietary provider's private key. The proprietary results module then constructs a hidden results form at a step 176. Similar to the hidden request form, the hidden results form is preferably an HTML form that includes the proprietary results as hidden form data and includes the redirect script. In this case, the hidden results form also includes the URL to the LMS submit module and other information needed by the LMS to identify and process the proprietary results data. For example, the hidden results form includes the student ID, assignment ID, and any other data needed by the LMS to associate the results with the appropriate student. At a step 178, the proprietary results module sends the hidden results form to the client browser, which executes the redirect script to automatically redirect the hidden results form data to the LMS submit module. As noted above, those skilled in the art will recognize that other techniques can be used to automatically redirect the proprietary results data to the LMS submit module.

Figure 8:
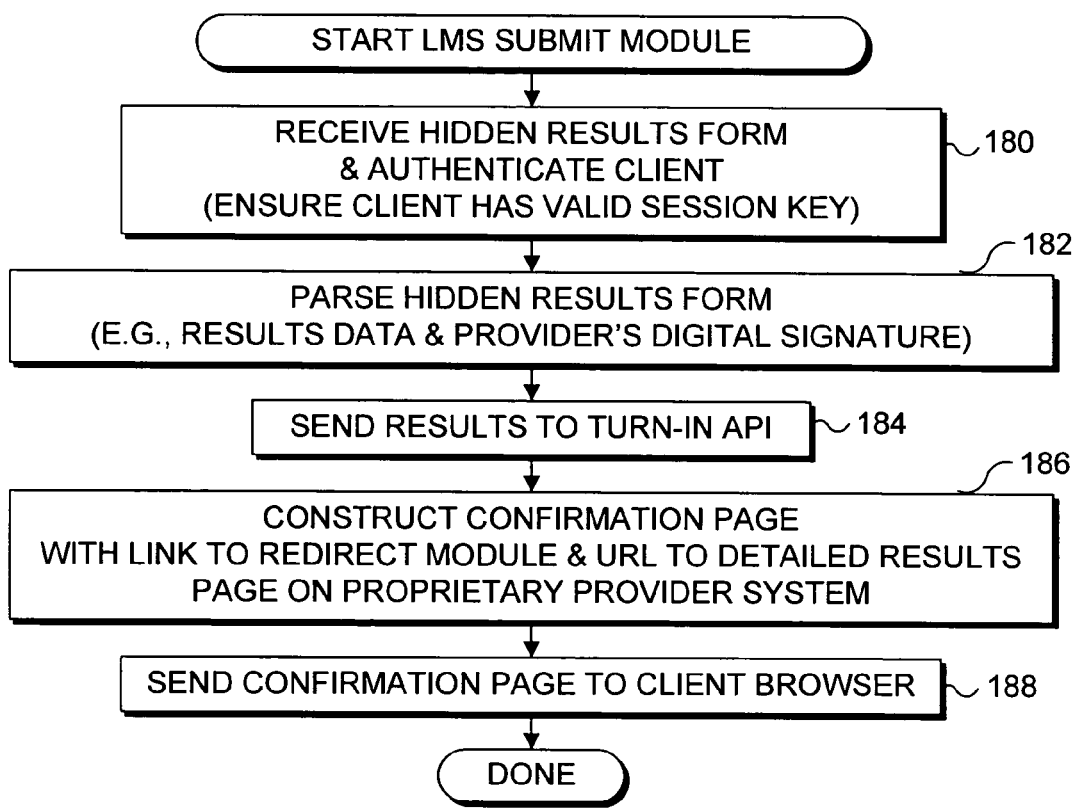
FIG. 8 is a flow diagram illustrating additional detailed logic performed by the LMS submit module.

FIG. 8 is a flow diagram illustrating additional detailed logic performed by the LMS submit module. As with many of the other modules, the LMS submit module is preferably an active server page that receives data as query parameters. For instance, at a step 180, the LMS submit module receives the hidden results form data as HTML form data elements. The LMS submit module preferably authenticates the client to ensure that the client has a currently valid session key. Because the client may not have communicated with the LMS for quite some time while interacting with the proprietary assignment pages, the LMS may require the user to log in again and obtain a currently valid session key.

At a step 182, the LMS submit module parses the hidden request form for the results data and any validation data such as a hash value for validating that the results data were digitally signed by the proprietary provider. At a step 184, the LMS submit module sends the results data to the turn-in API. Preferably, the LMS submit module does not check the digital signature. Instead, the LMS submit module awaits an indication that the turn-in API properly validated and stored the results data. Additional details regarding the turn-in API are provided below with regard to FIG. 9.

At a step 186 of FIG. 8, the LMS submit module constructs a confirmation page to indicate that the results were properly received and stored. Preferably, the confirmation page includes a link to the redirect module or other module that can redirect the user to a URL of the proprietary provider identifying the source of further details regarding the user's results on the assigned test(s). For example, a detailed results page from the proprietary provider may give statistics, standards, or other detailed information that will help the student user to better understand the results. At a step 188, the LMS submit module sends the confirmation page to the client browser.

Figure 9:
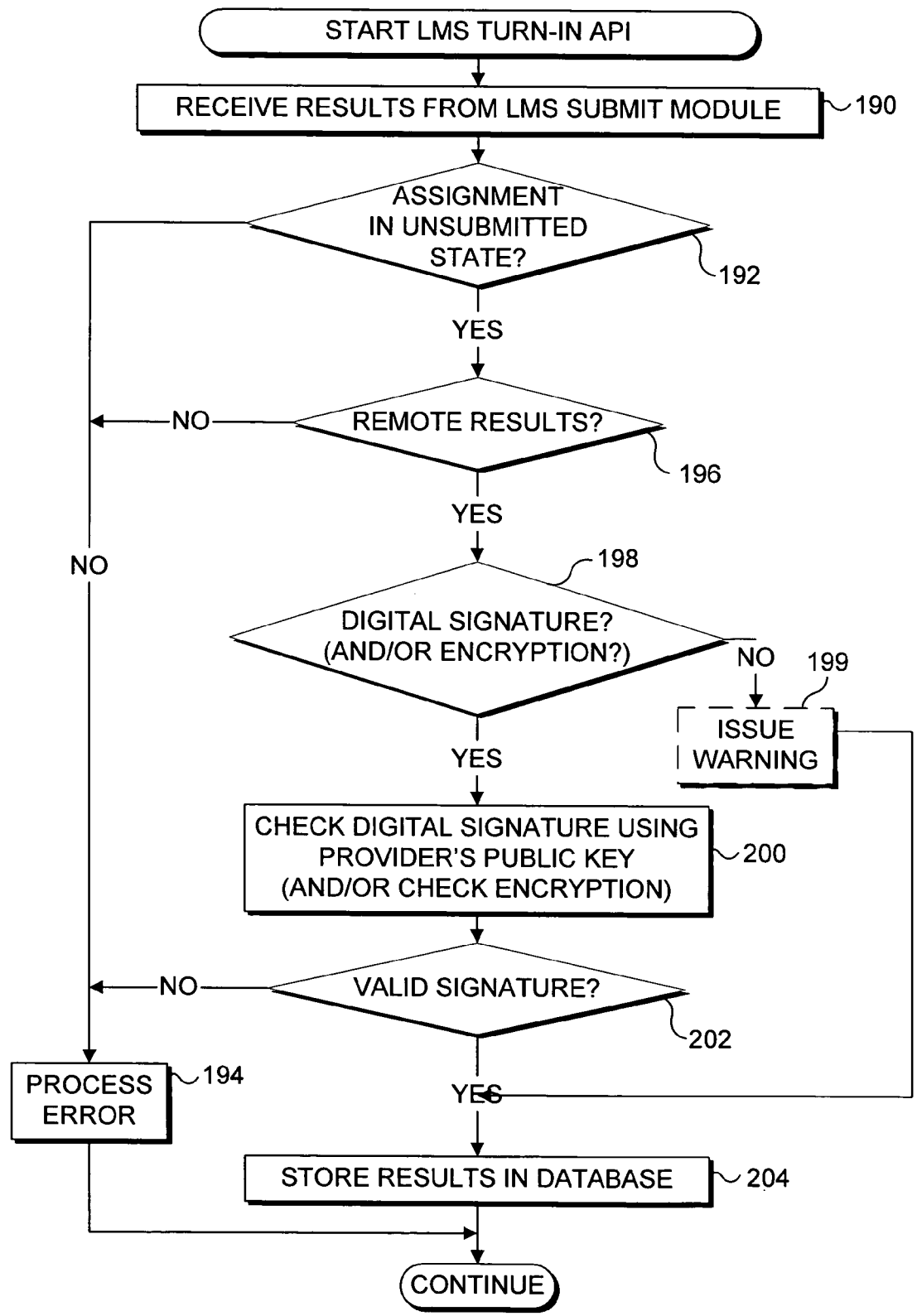
FIG. 9 is a flow diagram illustrating additional detailed logic performed by the turn-in API.

FIG. 9 is a flow diagram illustrating additional detailed logic performed by the turn-in API. At a step 190, the LMS turn-in API receives the results data from the LMS submit module. An example of some results data is shown below as a grading information element transmitted in the hidden results form. In this example, the grading information element includes grade sub-elements, which comprise a number of attributes, some examples of which are listed in Table 2. Those skilled in the art will recognize that other results schema could be used, including schema defined by standards bodies such as IMS.

```
<GradingInformation>
    <Grade Guid="<CreationID>" Score="73"/>
    <Grade Guid="e7d571a4-b1e8-4870-937d-1058671668c7"
Score="3" Comments="Correctly answered 17 out of 20 questions in
category: single-variable equations"/>
    <Grade Guid="d728124d-4e76-4626-a939-6f869617b39c"
```

-continued

Score="2" Comments="Correctly answered 12 out of 20 questions in category: multi-variable equations"/>
</GradingInformation> turn-in API validates the results data, at a step 200, using the proprietary provider's public key. At a decision step 202, the LMS turn-in API determines whether the digital signature was valid. If the digital signature was not valid, the LMS turn-in API processes an error at step 194. Alternatively, if the digital signature was valid, or if there was no digital signature, the LMS turn-in API stores the results data in the

TABLE 2

Grade Attributes

| Attribute | Required? | Validation | Description |
| --- | --- | --- | --- |
| Guid | Yes | | The GUID of the standard being graded. If the GUID does not match either the LR's CreationID or one of the standard GUIDs defined in the LR's Index.xml, then the entire <Grade> element is ignored. Use of the CreationID as the GUID for overall scoring provides some measure of protection from forgery in the case where results are unsigned, since it is hard for students to know this GUID. |
| Score | No | Overall score: −1,000 <= Float <= 10,000 | The score against the standard referenced in the StandardGUID attribute. If the StandardGUID is the same as the LR's CreationID, then the score represents the overall score for the LR. Otherwise, it represents the score for the standard. |
| | | Standard score: 0 <= Integer <= 4 | If score is missing, the standard or LR score is left unchanged. If any score is invalid, the API returns an error, and all results are ignored. |
| Comments | No | Overall Comments: String, <= 8,000 characters. | Comments to accompany the score. If the <Grade> element refers to a standard, these comments are put in the relevant standard's comment field. If it refers to the overall score, the comments are put in the teacher's comments field. If not present, the relevant text fields are left unchanged. |
| | | Standards Comments: String, <= 200 characters. | |

Prior to storing the grading information, the LMS turn-in API performs a number of verification steps. At a decision step 192, the LMS turn-in API determines whether the assignment associated with the submitted results data is currently in an unsubmitted state for the user that submitted the results data. If results data were previously submitted for the identified assignment, the LMS turn-in API processes an error at a step 194. Those skilled in the art will recognize that decision step 192 can be omitted or modified to allow for overwriting previously submitted results data. In this exemplary embodiment, if the assignment is in an unsubmitted state, the LMS turn-in API determines, at a decision step 196, whether the results are associated with a remote proprietary provider. For example, the LMS turn-in API can check for a proprietary provider ID submitted with the results data. If the results data did not come from a remote proprietary provider, the LMS turn-in API processes an error at step 194. Results from locally produced assignments are processed by separate program modules rather than the modules described herein.

However, for results data submitted from a remote proprietary provider, the LMS turn-in API determines, at a decision step 198, whether the results data were digitally signed. If the results data were not digitally signed, the LMS turn-in API can optionally issue a warning, process an error, or perform another operation at a step 199. Preferably, if the results data were not digitally signed, the LMS turn-in API simply passes the results data to the LMS database. However, if the results data were digitally signed, the LMS LMS database, at a step 204. Those skilled in the art will recognize that the turn-in API (or the submit module) could alternatively, or additionally, decrypt the results data and perform a check sum or other validation step before allowing the results data to be stored.

To better understand the above processes, several screen shots are now discussed. FIG. 10 is a screen shot of an exemplary assignment information page 210 that the browser displays to a student user providing preliminary information about a remote proprietary assignment. Assignment information page 210 illustrates that the LMS run-time module provides data from both the LMS and the proprietary provider. For example, identifiers 212 include the student's name provided from the LMS and the assignment name, provided from the proprietary provider. Similarly, logistics data 214 include scoring information that is obtained from the proprietary provider and also includes scheduling information that is assigned by the student's teacher through the LMS. A status box 216 indicates the status of the proprietary assignment relative to the individual student tracked by the LMS. A proprietary assignment link 218 enables the student user to initiate the redirection process through the LMS redirect module to the proprietary provider run-time module.

FIG. 11 is a screen shot of an exemplary proprietary content page 220 generated by the proprietary provider and sent to that the browser for display to a student user in performing a proprietary assignment. Proprietary content page 220 illustrates both proprietary content 222 and a proprietary assessment 224 with which the student user interacts and enters test answers. Proprietary content page 220 also includes student information 225, such as the student's name, teacher, and learning institution that passed from the LMS to the proprietary provider run-time module. Proprietary content page 220 further includes a quit link 226 that directs the student back to the LMS without submitting any data to the proprietary provider. Conversely, a score submission link 228 comprises the submit link that communicates the student's test answers to the proprietary provider results module for applying the proprietary assessment functions.

Although the present invention has been described in connection with the preferred form of practicing it and modifications thereto, those of ordinary skill in the art will understand that many other modifications can be made to the present invention within the scope of the claims that follow. For example, those skilled in the art will recognize that secure socket layer (SSL) encryption or other secure communications can be used to transfer requests, hidden forms, results, and other data between the LMS, the browser, and the proprietary provider. Those skilled in the art will also recognize that the invention described herein can be applied by any organization or individual to manage tasks while enabling a separate proprietary provider to maintain control over distribution of protected data related to those tasks and over assessment of a user's interaction with the protected data. Accordingly, it is not intended that the scope of the invention in any way be limited by the above description, but instead be determined entirely by reference to the claims that follow.

The invention in which an exclusive right is claimed is defined by the following:

1. At a learning management system (LMS) controlled by an organization, a method of enabling the organization to control user assignments and assessment results while enabling a proprietary provider to maintain control over distribution of proprietary content through an electronic network and over use of a proprietary assessment function, comprising the steps of:
    (a) receiving user authentication information for a user from web browser;
    (b) accessing a database to determine which assignments are available to the user based on the user authentication information, the assignments accessible from and controlled by the proprietary provider through the web browser;
    (c) providing the web browser with a link to the LMS, the link indicating access to the assignments determined to be available to the user;
    (d) receiving a request for the assignments determined to be available to the user;
    (e) generating a propreietary content uniform resorce locator (URL) identifying a location of proprietary content controlled by the proprietary provider in response to receiving the request;
    (f) generating a message for transmission to the browser, the message including hidden data and the proprietary content URL, the message configured to cause the browser to automatically request the proprietary content from the proprietary provider at the proprietary content URL without indicating to the user that the proprietary content was requested from the proprietary provider, the hidden data comprising at least one of information about the organization, the user that activated the link, the assignment, and the proprietary provider, the hidden data being used to control distribution of the proprietary content to the browser and the user's interaction with the proprietary content in completing the assignment; and
    (g) transmitting the generated proprietary content URL and the generated message to the browser.

2. The method of claim 1, wherein the proprietary content comprises at least one of text data, graphics data, audio data, and learning assessment data.

3. The method of claim 1, wherein the request for the proprietary content and the message each comprise a hidden hypertext markup language data form.

4. The method of claim 1, wherein at least one of:
    (a) the request includes the proprietary content URL; and
    (b) the message includes a results receiver URL identifying a location to which the proprietary provider is to send the assessment results indicating the user's interaction with the proprietary content.

5. The method of claim 1, further comprising the step of providing to the browser a quit link to the LMS, wherein the quit link comprises an early termination URL identifying a location of the LMS to which the browser is redirected by the proprietary provider if the user chooses to return to interacting with the LMS without submitting any information to the proprietary provider.

6. The method of claim 1, further comprising the step of providing to the browser a submit link to the proprietary assessment function controlled by the proprietary provider, wherein the submit link comprises a results receiver URL identifying a location of a results receiver that is controlled by the organization and that is to receive the assessment results generated by the proprietary assessment function as a result of the user's interaction with the proprietary content.

7. The method of claim 6, further comprising the steps of:
    (a) upon activation of the submit link, communicating a results request for the assessment results from the browser to the proprietary assessment function, the results request including the results receiver URL; and
    (b) causing the proprietary assessment function to generate the assessment results and to provide a result message back to the browser, the result message including the assessment results and the results receiver URL, and the result message causing the browser to automatically communicate the assessment results to the results receiver at the results receiver URL.

8. The method of claim 7, further comprising the steps of:
    (a) causing the proprietary results provider to at least one of:
        (i) digitally sign the assessment results prior to causing the proprietary assessment function to provide the result message back to the browser; and
        (ii) encrypt the assessment results prior to causing the proprietary assessment function to provide the result message back to the browser; and
    (b) causing the results receiver to authenticate the digitally signed assessment results.

9. The method of claim 7, wherein the assessment results comprise at least one of an indication that the user interacted with the proprietary content and an evaluation of the user's performance in interacting with the proprietary content.

10. A memory medium on which are stored machine instructions for carrying out the steps of claim 1.

11. A system for enabling an organization to control user assignments and assessment results while enabling a proprietary provider to maintain control over distribution of proprietary content through an electronic network and over use of a proprietary assessment function, wherein a user has coupled in communication with the system to obtain an assignment, comprising:

(a) a processor;
(b) a network interface in communication with the processor and the electronic network; and
(c) a memory in communication with the processor, the memory storing machine instructions that cause the processor to carry out a plurality of functions, including:
  (i) receiving user authentication information for a user from web browser;
  (ii) accessing a database to determine which assignments are available to the user based on the user authentication information, the assignments accessible from and controlled by the proprietary provider through the web browser;
  (iii) providing the web browser with a link to the LMS, the link indicating access to the assignments determined to be available to the user;
  (iv) receiving a request for the assignments determined to be available to the user;
  (v) generating a proprietary content uniform resource locator (URL) identifying a location of proprietary content controlled by the proprietary provider in response to receiving the request;
  (vi) generating a message for transmission to the browser, the message including hidden data and the proprietary content URL, the message configured to cause the browser to automatically reciuest the proprietary content from the proprietary provider at the proprietary content URL without indicating to the user that the proprietary content was requested from the proprietary provider, the hidden data comprising at least one of information about the organization, the user that activated the link, the assignment, and the proprietary provider, the hidden data being used to control distribution of the proprietary content to the browser and the user's interaction with the proprietary content in completing the assignment; and
  (vii) transmitting the generated proprietary content URL and the generated message to the browser.

12. The system of claim 11, wherein the proprietary content comprises at least one of text data, graphics data, audio data, and learning assessment data.

13. The system of claim 11, wherein the instruction to redirect the browser and the message from the browser each comprise a hypertext markup language data form.

14. The system of claim 11, wherein the machine instructions further cause the processor to carry out the function of providing to the browser a submit link, wherein the submit link comprises a results receiver URL identifying a location of a results receiver module of the machine instructions that receives the message from the browser, the message including the proprietary data.

15. The system of claim 11, wherein the machine instructions further cause the processor to carry out at least one of the functions of:
(a) validating a digital signature applied by the proprietary provider to the proprietary data of the message received from the browser; and
(b) decrypting the message received from the browser.

16. The system of claim 11, wherein the proprietary data comprise at least one of an indication that the user interacted with the proprietary content and an evaluation of the user's performance in interacting with the proprietary content.

17. At a learning management system (LMS) controlled by an organization, a method for controlling distribution of proprietary data through an electronic network and controlling use of a proprietary function that assesses a user's interaction with the proprietary data, comprising the steps of:

(a) receiving user authentication information for a user from web browser;
(b) accessing a database to determine which assignments are available to the user based on the user authentication information, the assignments accessible from and controlled by the proprietary provider through the web browser;
(a) providing a proprietary data uniform resource locator (URL) to a user management system that interfaces with a user over the electronic network through the web browser;
(b) receiving a request from the user via the web browser for access to the proprietary data as a result of the user having actuated the proprietary data URL,
(c) communicating the proprietary data URL to the browser along with information indicating to the web browser that the browser is to redirect the proprietary data request to the proprietary data URL to the proprietary provider;
(d) receiving from the browser an indication of the user's interaction with the proprietary data through the browser; and
(e) performing the proprietary function based on the indication of the user's interaction with the proprietary data to assess the user's interaction with the proprietary data.

18. The method of claim 17, wherein the indication of the user's interaction with the proprietary data comprises responses to tasks presented to the user in the proprietary data.

19. The method of claim 17, further comprising the steps of:
(a) producing results data based on the performance of the proprietary function; and
(b) communicating the results data to the browser with an instruction to the browser to redirect the results data to the user management system.

20. At a computer system including a web browser, a method of enabling an organization to control user assignments and assessment results while enabling a proprietary provider to maintain control over distribution of proprietary content through an electronic network and over use of a proprietary assessment function, comprising the steps of:
(a) transmitting user authentication information to a learning management system (LMS) controlled by an organization;
(b) receiving a link to proprietary content associated with the user and a message including hidden data, the hidden data comprising at least one of information about the organization, the user that activated the link, the assignment, and the proprietary provider;
(c) automatically transmitting a request for the proprietary content to the proprietary provider using the received link to the proprietary content along with the hidden data without indicating to the user that the proprietary content was requested from the proprietary provider such that it appears to the user that the proprietary content was requested from the LMS, the hidden data being usable to determine which assignments and other proprietary information are accessible to the user; and
(d) receiving the proprietary content at the browser so that the user can interact with the proprietary content.

* * * * *